United States Patent
Hong

(10) Patent No.: US 9,099,761 B2
(45) Date of Patent: Aug. 4, 2015

(54) RECHARGEABLE BATTERY INCLUDING TEMPERATURE PROTECTION ELEMENT CONNECTED TO LEAD TAB AND CONNECTION TAB

(75) Inventor: Sung-Ho Hong, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 300 days.

(21) Appl. No.: 13/617,526

(22) Filed: Sep. 14, 2012

(65) Prior Publication Data

US 2013/0089762 A1    Apr. 11, 2013

Related U.S. Application Data

(60) Provisional application No. 61/544,809, filed on Oct. 7, 2011.

(51) Int. Cl.
| | |
|---|---|
| *H01M 2/06* | (2006.01) |
| *H01M 10/637* | (2014.01) |
| *H01M 2/34* | (2006.01) |
| *H01M 10/65* | (2014.01) |

(52) U.S. Cl.
CPC .......... *H01M 10/5026* (2013.01); *H01M 2/348* (2013.01); *H01M 10/5034* (2013.01); *H01M 2200/10* (2013.01); *H01M 2200/106* (2013.01)

(58) Field of Classification Search
CPC ............ H01M 2/348; H01M 10/5026; H01M 10/5034; H01M 2200/10; H01M 2200/106
USPC .......................................................... 429/62
See application file for complete search history.

(56) References Cited

U.S. PATENT DOCUMENTS

| | | | |
|---|---|---|---|
| 6,225,778 B1 * | 5/2001 | Hayama et al. | 320/112 |
| 7,935,439 B2 | 5/2011 | Kim | |
| 2002/0150815 A1 | 10/2002 | Ehara | |
| 2004/0257036 A1 | 12/2004 | Kim | |
| 2006/0083984 A1 * | 4/2006 | Oh et al. | 429/176 |
| 2006/0099503 A1 * | 5/2006 | Lee | 429/176 |
| 2008/0070067 A1 | 3/2008 | Jang et al. | |
| 2008/0292962 A1 * | 11/2008 | Jung | 429/211 |
| 2011/0123836 A1 | 5/2011 | Jang | |
| 2011/0123838 A1 | 5/2011 | Lee et al. | |
| 2012/0009467 A1 * | 1/2012 | Park | 429/178 |

FOREIGN PATENT DOCUMENTS

| | | |
|---|---|---|
| JP | 2005-129442 | 5/2005 |
| KR | 10-1998-0038177 | 8/1998 |
| KR | 20-2011-0000005 | 1/2011 |

OTHER PUBLICATIONS

The Extended European Search Report dated Jan. 30, 2013 issued by EPO which connection with European Patent Application No. 12185895.5 and also which in claims priority from the present U.S. Appl. No. 61/544,809.

* cited by examiner

*Primary Examiner* — Sean P Cullen
(74) *Attorney, Agent, or Firm* — Robert E. Bushnell, Esq.

(57) ABSTRACT

A rechargeable battery that includes a pouch installing an electrode assembly, first and second lead tabs connected to the electrode assembly and drawn out to one side of the pouch, a temperature protection element connected to the first tab, and a connection tab connected to the temperature protection element. The temperature protection element is attached to the pouch using a double-sided adhesive tape and covered by an insulation tape.

16 Claims, 7 Drawing Sheets

RECHARGEABLE BATTERY INCLUDING TEMPERATURE PROTECTION ELEMENT CONNECTED TO LEAD TAB AND CONNECTION TAB

CLAIM OF PRIORITY

This application claims priority to and the benefit of Provisional Application No. 61/544,809 filed on 7 Oct. 2011, in the United States Patent and Trademark Office, the entire content of which is incorporated herein by reference.

BACKGROUND OF THE INVENTION

1. Field of the Invention

The present invention generally relates to a rechargeable battery.

2. Description of the Related Art

With the development and advancement in mobile devices the demand for and usage of rechargeable batteries has increased as an energy source. In addition, these mobile devices are now down-sized, light, slim with increased high-energy usage. To meet the requirements of these mobile devices, flatly formed rechargeable batteries using a polymer film are often used. A pouch type rechargeable battery may be effectively used to provide for the sliminess required of the battery.

The above information disclosed in this Related Art section is only for enhancement of understanding of the background of the invention and therefore it may contain information that does not form the prior art that may be known to a person of ordinary skill in the art.

SUMMARY OF THE INVENTION

One aspect of the present invention has been made in an effort to provide a pouch type rechargeable battery having improved operation quality by preventing malfunction of a temperature protection element. An exemplary embodiment is a battery having an electrode assembly with a first lead tab extending from a first electrode of the electrode assembly, a second lead tab extending from a second electrode of the electrode assembly, and a separator disposed between the first and second electrode. The battery may include a pouch housing the electrode assembly having a terrace portion, the first lead tab and the second lead tab extending through the terrace portion of the pouch, a portion of the first lead tab in contact with the terrace portion of the pouch; and a temperature protection element connected to the first lead tab and a connection tab, a portion of the temperature protection element attached to the terrace portion of the pouch.

When the electrical resistance in the temperature protection element increases to the point where current flow between the connection tab and first lead portion may stop when a temperature of the pouch exceeds a predetermined value.

The temperature protection element may further include a first connection portion electrically connected to the first lead tab, a portion of the first connection portion in contact with the terrace portion of the pouch; a second connection portion electrically connected to the connection tab; and a transmission portion connected to the first connection portion.

The transmission portion may be affixed to a surface of the terrace portion of the pouch by a double-sided adhesive tape.

The pouch may further include a first exterior material lining an interior of the pouch; and a second exterior material attached to the first exterior material forming an exterior of the pouch.

Both the first exterior material and the second exterior material may further include: a first sheet composed of a polymer forming an interior of the pouch; a second sheet made of a polyethyleneterephthalate (PET) sheet, a nylon sheet, or a PET-nylon compound sheet forming an exterior of the pouch; and a metal sheet disposed between the first and second sheets.

A portion of the first connection portion may be bent over and wind around an end of the first lead tab.

Further, the first connection portion and the first lead tab may be welded together.

In addition, a portion of the connection tab may be in direct contact with the terrace portion of the pouch.

An insulation tape may cover the temperature protection element, a portion of the first lead tab and a portion of the connection tab.

The first connection portion may be directly attached to the pouch and insulated by the second sheet.

The temperature protection element may be a positive temperature coefficient resistor.

The terrace portion of the pouch may be an extension of the pouch exterior to the electrode assembly.

Further, the first exterior material may receive the electrode assembly.

The second connection portion and the connection tab may be welded together.

The first lead tab may be a positive lead tab and second lead tab may be a negative lead tab.

The positive lead tab may be made of nickel.

The negative lead tab may be made of aluminum.

The metal sheet may be made of aluminum.

The portion of the first lead tab may be in contact with the metal sheet of the first exterior material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
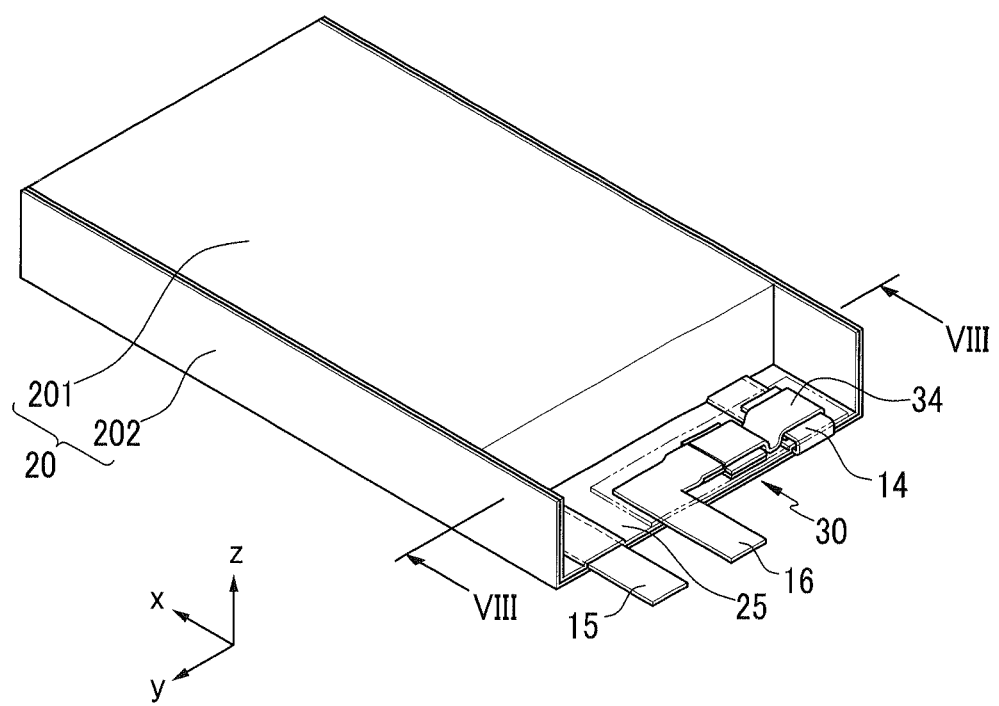
FIG. 1 is a perspective view of a pouch type rechargeable battery according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

In the pouch type rechargeable battery, an electrode assembly is formed by stacking a positive electrode and a negative electrode on both surfaces, putting the polymer film passing through lithium ion therebetween. The lithium ion polymer rechargeable battery installs the electrode assembly in the pouch by disposing the exterior material on both surfaces of the electrode assembly and thermally fusing peripheral portions of the exterior material.

A positive electrode lead tab connected to the positive electrode of the electrode assembly and a negative electrode lead tab connected to the negative electrode are drawn out to one side of the pouch. The positive electrode lead tab and the negative electrode lead tab are electrically connected to a protection circuit module (PCM) that installs protection circuit parts.

The protective circuit module prevents overcharge, overdischarge, overcurrent, and short of the rechargeable battery. In addition, a temperature protection element having a positive temperature coefficient is used between the protective circuit module and the positive electrode lead tab.

When the temperature of the rechargeable battery reaches the predetermined risk value, the temperature protection element, i.e., Thermal-Cut-Off (TCO) electrically isolates the positive terminal from the protective circuit module and when the temperature of the rechargeable battery reaches the setup safety value, the temperature protection element again connects the positive terminal to the protective circuit module.

Therefore, a need exists for the temperature protection element having the excellent temperature detecting performance for the rechargeable battery.

Figure 2:
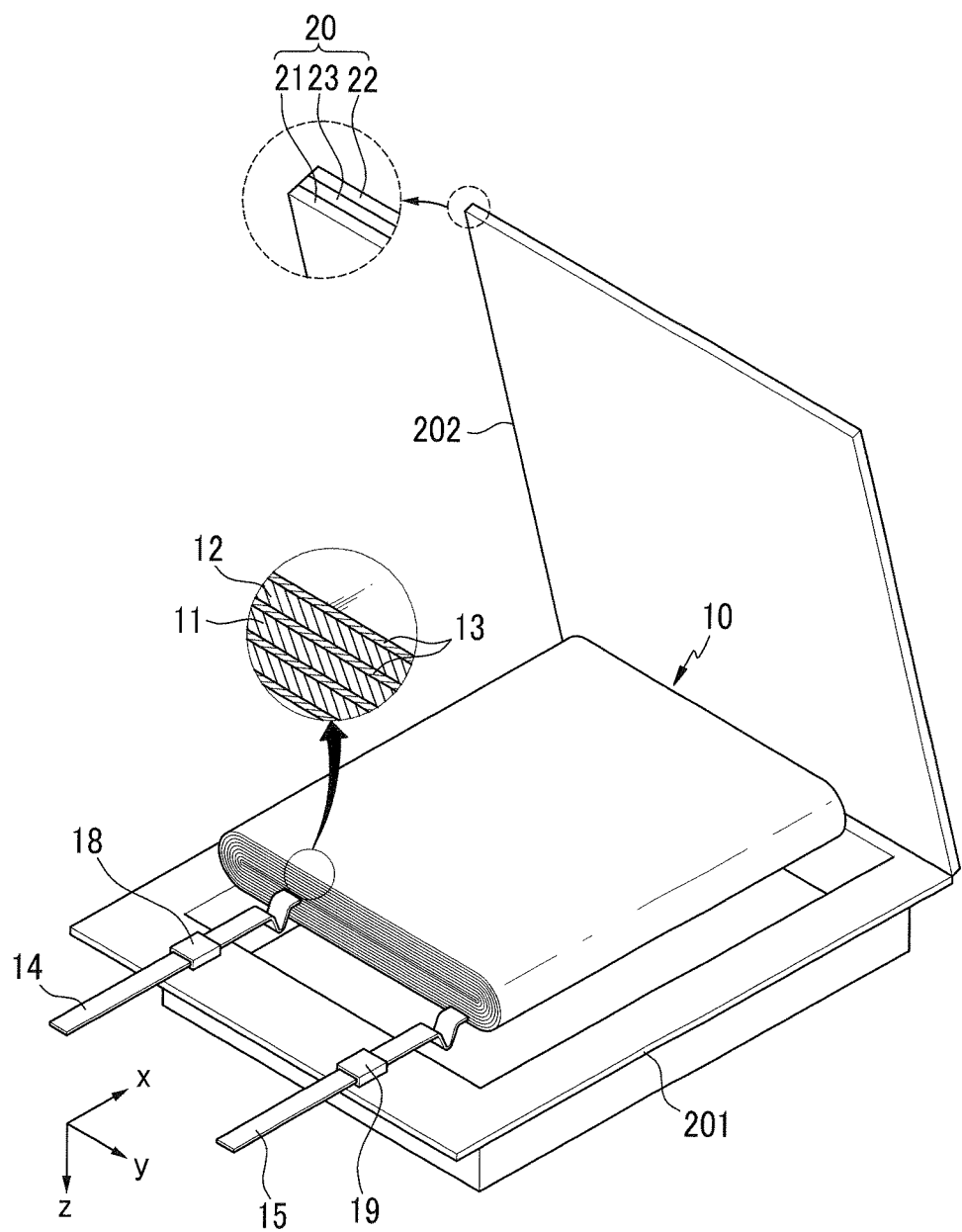
FIG. 2 is an exploded perspective view of an electrode assembly and a pouch of the pouch type rechargeable battery according to the exemplary embodiment of the present invention.

FIG. 1 is a perspective view of a pouch type rechargeable battery according to an exemplary embodiment of the present invention and FIG. 2 is an exploded perspective view of an electrode assembly 10 and a pouch 20 of the pouch type rechargeable battery according to the exemplary embodiment of the present invention. Referring to FIG. 1 and FIG. 2, the rechargeable battery according to the exemplary embodiment includes the electrode assembly 10 and the pouch 20 installing the electrode assembly 10.

The electrode assembly 1 may be formed in the shape of a jelly roll by winding a first electrode (for convenience, referred to as a positive electrode) 11 and a second electrode (for convenience, referred to as a negative electrode) 12, interposing a separator 13 therebetween. The separator 13 may be formed of a polymer film that transmits lithium ion.

Figure 3:
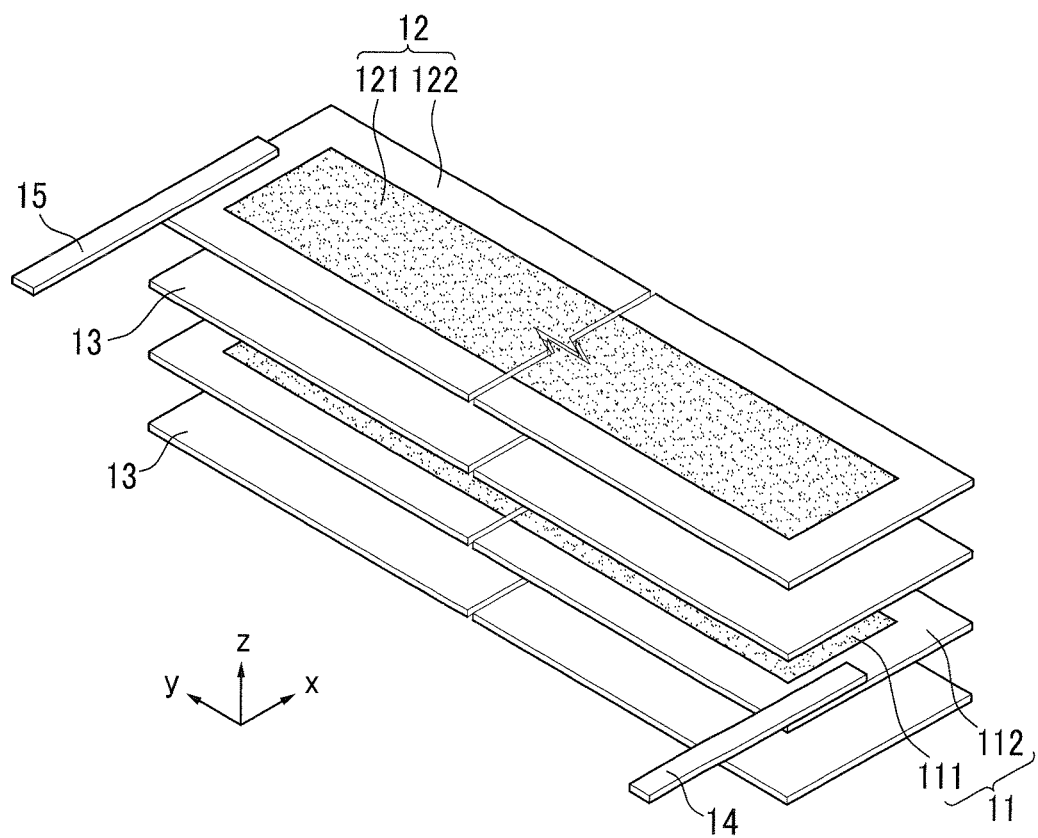
FIG. 3 is an exploded perspective view of the electrode assembly of the pouch type rechargeable battery according to the exemplary embodiment of the present invention.

FIG. 3 is an exploded perspective view of the pouch type electrode assembly 10 of the rechargeable battery according to the exemplary embodiment of the present invention. Referring to FIG. 3, the positive electrode 11 includes a coated region 111 where an active material may be coated on a thin film current collector and an uncoated region 112 where a current collector is exposed because of not being coated with the active material. A first lead tab (for convenience, referred to as a positive electrode lead tab) 14 may be connected to the uncoated region 112 of the positive electrode 11.

The negative electrode 12 includes a coated region 121 where an active material that may be different from the active material of the positive electrode 11 may be coated on a thin film current collector and an uncoated region 122 where a current collector may be exposed because of not being coated with the active material. The second lead tab (for convenience, referred to as a negative electrode lead tab) 15 may be connected to the uncoated region 122 of the negative electrode 12 from the opposite side of the first lead tab 14.

The positive electrode lead tab 14 and the negative electrode lead tab 15 are respectively drawn out toward the same side (zy plane of FIG. 3) of the electrode assembly 10. Further, the positive electrode lead tab and the negative electrode lead tab may be respectively disposed at the opposite side (lateral sides in x-axis direction of FIG. 1) of the electrode assembly (not shown).

Referring back to FIG. 2, the pouch 20 may have a multi-layered sheet that surrounds the exterior of the electrode assembly 10. For example, the pouch 20 includes a polymer sheet 21 forming the interior and providing insulation and thermal adhesion functions, a polyethyleneterephthalate (PET) sheet, a nylon sheet, or a PET-nylon compound sheet 22 (hereinafter, referred to as a nylon sheet for convenience of description), and a metal sheet 23 providing mechanical strength. The metal sheet 23 may be disposed between the polymer sheet 21 and the nylon sheet 22, and may be exemplarily formed of an aluminum sheet.

In addition, referring to FIG. 1 and FIG. 2, the pouch 20 includes a first exterior material 201 receiving the electrode assembly 10 and a second exterior material 202 thermally adhered to the first exterior material 201 from the outside of the electrode assembly 10 while covering the electrode assembly 10. The first and second exterior materials 201 and 202 may be the same as the polymer sheet 21, the nylon sheet 22, and the metal sheet 23 in structure.

For example, the first exterior material 201 has a concave structure for receiving the electrode assembly 10 and the second exterior material 202 may be formed flat to cover the electrode assembly 10 received in the first exterior material 201.

Further, the electrode assembly 10 has a cuboid flat structure, and accordingly, the pouch 20 may be formed in the shape of a cuboid flat structure. The rechargeable battery may be formed by surrounding the electrode assembly 10 with the pouch 20, and therefore the rechargeable battery is entirely formed in the shape of the cuboid flat structure.

The positive electrode lead tab 14 and the negative electrode lead tab 15 are connected to the outside of the thermally adhered pouch 20 so that the electrode assembly 10 may be electrically drawn out to the outside of the pouch 20. That is, the positive electrode lead tab 14 and the negative electrode lead tab 15 are disposed penetrating the thermally adhered first and second exterior materials 201 and 202 in a terrace portion 25 formed in one side (the yz plane of FIG. 1) of the pouch 20. In this case, the positive electrode lead tab 14 and the negative electrode lead tab 15 are electrically insulated from the pouch 20 by insulating members 18 and 19.

The terrace portion 25 may be formed by thermally adhering the first exterior material 201 bent along the electrode assembly 10 at the drawn-out side of the positive electrode lead tab 14 and the negative electrode lead tab 15 to a flat bottom side of the second exterior material 202.

The rechargeable battery includes a protection circuit module (not shown) formed by installing protection circuit elements in a circuit board for protection from overcharge, overdischarge, overcurrent, and external short. The protective circuit module may be disposed in the terrace portion.

The negative electrode lead tab 15 may be directly connected to the protective circuit module, and the positive electrode lead tab 14 may be connected to the protection circuit module through a temperature protection element 30. The temperature protection element 30 has a positive temperature coefficient and thus the resistance is infinitely increased at a predetermined temperature.

Figure 4:
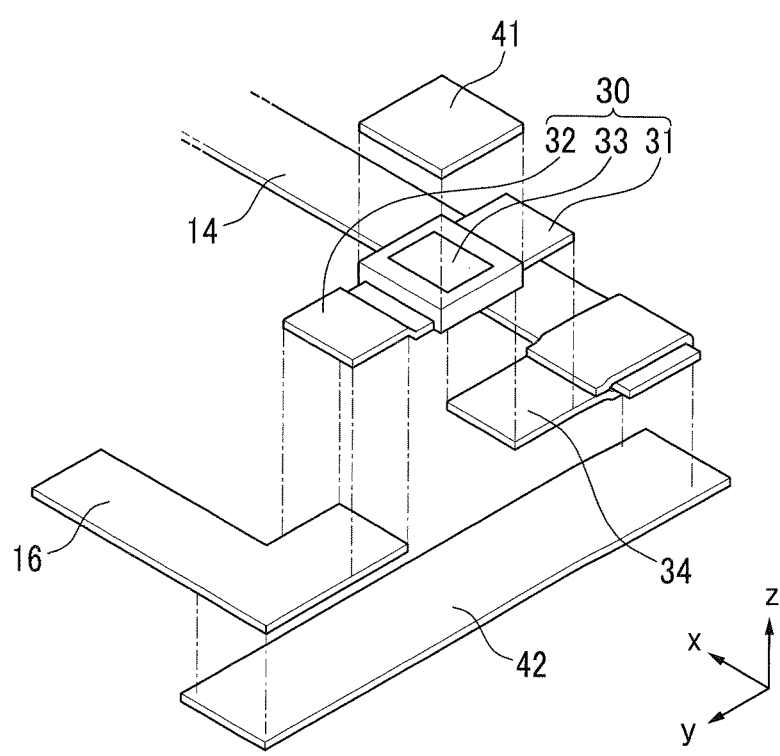
FIG. 4 is an exploded perspective view of a positive electrode lead tab and a temperature protection element of the pouch type rechargeable battery according to the exemplary embodiment of the present invention.
Figure 5:
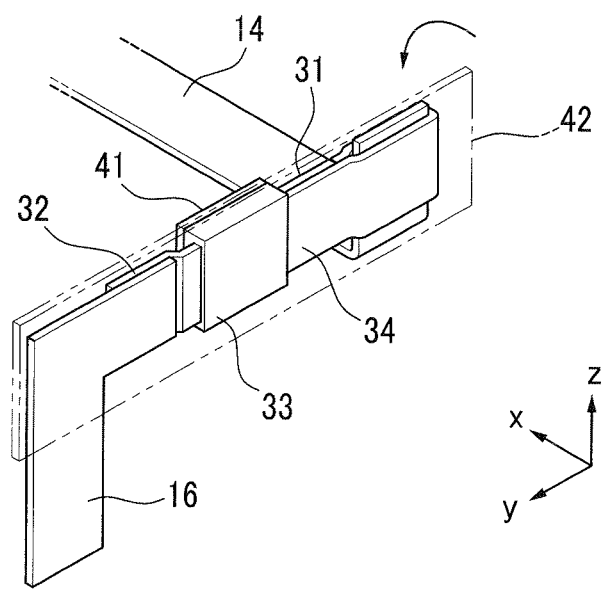
FIG. 5 is a perspective view showing folding state of assembly of a positive electrode lead tab and a temperature protection element of the pouch type rechargeable battery shown in FIG. 4.
Figure 6:
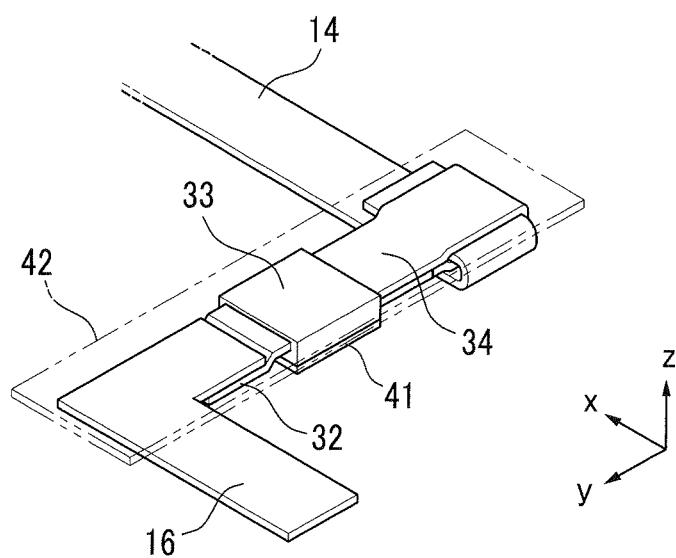
FIG. 6 is a perspective view showing folded state of assembly of a positive electrode lead tab and a temperature protection element of the pouch type rechargeable battery shown in FIG. 4.

FIG. 4 is an exploded perspective view of the positive electrode lead tab 14 and the temperature protection element 30 of the pouch type rechargeable battery of the exemplary embodiment of the present invention. FIG. 5 is a perspective view showing folding state of assembly of a positive electrode lead tab and a temperature protection element of the pouch type rechargeable battery shown in FIG. 4, FIG. 6 is a perspective view showing folded state of assembly of a positive electrode lead tab and a temperature protection element of the pouch type rechargeable battery shown in FIG. 4. Referring to FIG. 1, FIG. 4 through FIG. 6, the positive electrode lead tab 14 may be drawn out to the outside of the pouch 20 and then mechanically and electrically connected to the temperature protection element 30.

For example, the temperature protection element 30 includes a first connection portion 31 connected to the positive electrode lead tab 14, a transmission portion 33 connected to the first connection portion 31, and a second connection portion 32 connected to the transmission portion 33.

An extension portion 34 winds an end of the positive electrode lead tab 14 and then coupled to the first connection portion 31 by welding. The second connection portion 32 and a connection tab 16 are coupled with each other by welding. The transmission portion 33 transmits heat to the inside of the temperature protection element 30 having the positive temperature coefficient. The temperature protection element 30 blocks a current between the positive electrode lead tab 14 and the connection tab 16 when a temperature of the rechargeable battery reaches a predetermined level due to the heat transmission of the transmission portion 33.

The positive electrode lead tab 14 may be connected to the temperature protection element 30 through the extension portion 34, the temperature protection element 30 may be connected to the connection tab 16, the positive electrode lead tab 14 may be bent such that the first connection portion 31 of the temperature protection element 30 can be further connected to the positive electrode lead tab 14. Thus, the positive electrode lead tab 14 and the first connection portion 31 form a connection surface as the multi-layer structure.

In this case, the transmission portion 33 of the temperature protection element 30 may be attached to the terrace portion 25 of the pouch 20 by providing a double-sided adhesive tape 41, and the connection tab 16 protrudes to the outside of the terrace portion 25 in a location that may be closer to the negative electrode lead tab 15 from the positive electrode lead tab 14 along the y-axis direction.

Thus, the heat generated from the electrode assembly 10 and then transmitted from the pouch 20 is transmitted through the transmission portion 33 attached to the terrace portion 25 and then sensed by the temperature protection element 30. Thus, the temperature protection element 30 can detect an accurate temperature of the rechargeable battery, generated from the electrode assembly 10.

For convenience, FIG. 1 illustrates that the transmission portion 33 may be attached to the terrace portion 25 by the double-sided adhesive tape 41. Thus, the connection structure of the second connection portion 32 and the connection tab 16 can be stably maintained even through the second connection portion 32 may be shorter than the first connection portion 31.

As described, in the outside of the pouch 20, the temperature protection element 30 may be connected to the positive electrode lead tab 14 and the connection tab 16 may be connected to the temperature protection element 30. In addition, the connection tab 16 may be electrically connected to the protection circuit module (not shown) together with the negative electrode lead tab 15.

Figure 7:
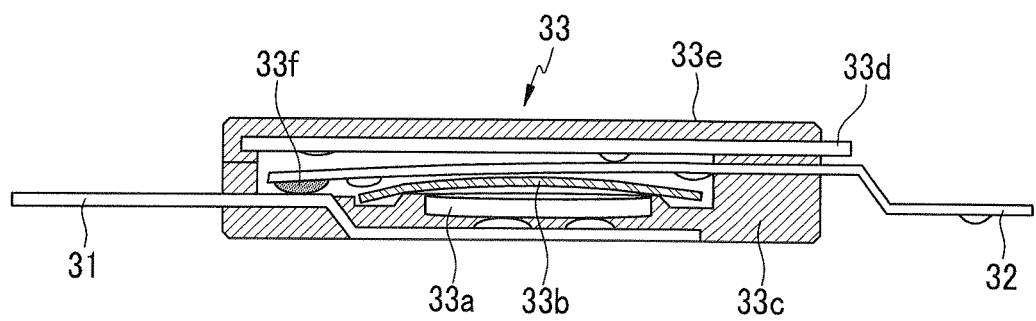
FIG. 7 is a cross-sectional view showing inside of a temperature protection element.

FIG. 7 is a cross-sectional view showing inside of the temperature protection element.

As shown in FIG. 7, the temperature protection element may be formed by coupling a base 33c and a cover 33e, and includes the first connection portion 31, transmission portion 33 and the second connection portion 32. Positive temperature coefficient element (PTC element) 33a contacts with the first connection portion 31 within the transmission portion 33, and a bimetal disc 33b contacts with upper side of the PTC element 33a within the transmission portion 33. The second connection portion 32 contacts with the first connection portion 31 at a contact point 33f, and the second connection portion 32 also contacts with the bimetal disc 33b. The first connection portion 31 extends inside of the transmission portion 33 and partly exposed toward bottom side.

Hence, the first connection portion 31 and the second connection portion 32 contacts with and electrically coupled to each other. When heat is transferred to the portion of the first connection portion 31 exposed through the bottom of the transmission portion 33, the PTC element 33a is heated to reverse the bimetal disc 33b. The reversed bimetal disc 33b pushes the second connection portion 32 toward upper side of the transmission portion 33 (precisely into an abutment portion 33d) such that the first connection portion 31 and the second connection portion 32 separates from each other resulting in electrical cut off.

Figure 8:
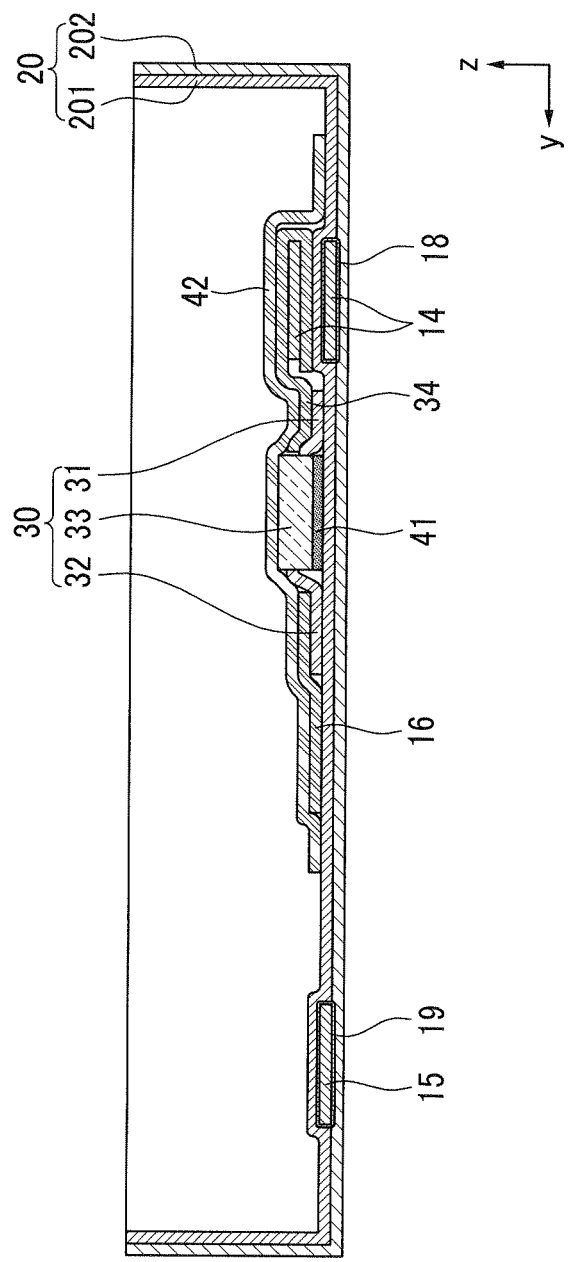
FIG. 8 is a cross-sectional view of FIG. 1, taken along the line VIII-VIII.

FIG. 8 is a cross-sectional view of FIG. 1, taken along the line Referring to FIG. 8, the first connection portion 31 of the temperature protection element 30 directly contacts the pouch 20 and thus directly discharges heat of the positive electrode lead tab 14 to the pouch 20. In further detail, a portion of the first connection portion 31, disposed between the transmission portion 33 and the positive electrode lead tab 14 directly contacts the pouch 20.

In this case, since the first connection portion 31 may be directly attached to the pouch 20 without an insulation tape, the first connection portion 31 has excellent heat dissipation performance. The first connection portion 31 may be electrically insulated by the nylon sheet 22 in the external side of the pouch 20. In addition, the external side of the pouch 20 may be formed of a conductive material and thus an electric connection structure may be formed between the first connection portion 31 and the pouch 20, the pouch 20 may have positive polarity (not shown).

Thus, the transmission portion 33 is not influenced by heat transmitted from the positive electrode lead tab 14 connected to the first connection portion 31, and detects a temperature depending on the heat directly transmitted from the pouch 20. The temperature protection element 30 may be activated by detecting the temperature of the rechargeable battery using the heat transmitted to the transmission portion 33. Thus, a current can be promptly blocked between the positive electrode lead tab 14 and the connection tab 16 by the activation of the temperature protection element 30.

Meanwhile, an insulation tape 42 wholly covers the temperature protection element 30, that is, covers the first and second connection portions 31 and 32 connected to the transmission portion 33, covers a connection portion of the first connection portion 31, the extension portion 34 and the positive electrode lead tab 14, and may be attached to the terrace portion 25 by covering the connection tab 16 portion of the second connection portion 32.

That is, a metal portion having conductivity in the temperature protection element 30 may be covered by the insulation tape 42, and therefore possibility of short-circuit of the temperature protection element 30 can be eliminated and the temperature protection element 30 can be firmly fixed to the terrace portion 25.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery having an electrode assembly with a first lead tab extending from a first electrode of the electrode assembly, a second lead tab extending from a second electrode of the electrode assembly, and a separator disposed between the first and second electrode, the battery comprising:
    a pouch housing the electrode assembly having a terrace portion, the first lead tab and the second lead tab extending through the terrace portion of the pouch, a portion of the first lead tab in contact with the terrace portion of the pouch; and
    a temperature protection element connected to the first lead tab and a connection tab, a portion of the temperature protection element attached to the terrace portion of the pouch,
        wherein the temperature protection element, further comprises:
            a first connection portion electrically connected to the first lead tab, a portion of the first connection portion in contact with the terrace portion of the pouch;
            a second connection portion electrically connected to the connection tab;
            a transmission portion connected to the first connection portion; and
            an extension portion is bent over and winds around an end of the first lead tab, the extension portion is in contact with the first connection portion.

2. The battery recited in claim 1, wherein electrical resistance in the temperature protection element increases to the point where current flow between the connection tab and the first lead tab stops when a temperature of the pouch exceeds a predetermined value.

3. The battery recited in claim 1, wherein the transmission portion is affixed to a surface of the terrace portion of the pouch by a double-sided adhesive tape.

4. The battery recited in claim 1, wherein the pouch further comprises:
    a first exterior material forming an interior of the pouch; and
    a second exterior material attached to the first exterior material forming an exterior of the pouch.

5. The battery recited in claim 4, wherein both the first exterior material and the second exterior material, further comprising:
    a first sheet composed of a polymer forming an interior of the pouch;
    a second sheet made of a polyethyleneterephthalate (PET) sheet, a nylon sheet, or a PET-nylon compound sheet forming an exterior of the pouch; and
    a metal sheet disposed between the first and second sheets.

6. The battery recited in claim 5, wherein the metal sheet is made of aluminum.

7. The battery recited in claim 1, wherein the first connection portion and the extension portion are welded together.

8. The battery recited in claim 1, wherein a portion of the connection tab is in direct contact with the terrace portion of the pouch.

9. The battery recited in claim 1, wherein an insulation tape covers the temperature protection element, a portion of the first lead tab and a portion of the connection tab.

10. The battery recited in claim 1, wherein the first connection portion is directly attached to the pouch and insulated by the second sheet.

11. The battery recited in claim 1, wherein the temperature protection element is a positive temperature coefficient resistor.

12. The battery recited in claim 1, wherein the terrace portion of the pouch is an extension of the pouch exterior to the electrode assembly.

13. The battery recited in claim 1, wherein the second connection portion and the connection tab are welded together.

14. The battery recited in claim 1, wherein the first lead tab is a positive lead tab and the second lead tab is a negative lead tab.

15. The battery recited in claim 14, wherein the positive lead tab is made of nickel.

16. The battery recited in claim 14, wherein the negative lead tab is made of aluminum.

* * * * *